United States Patent
Eves et al.

(10) Patent No.: US 7,616,262 B2
(45) Date of Patent: Nov. 10, 2009

(54) CONTROLLING AMBIENT LIGHT AS A FUNCTION OF A VIDEO SIGNAL

(75) Inventors: David A. Eves, Crawley (GB); Richard S. Cole, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 484 days.

(21) Appl. No.: 10/515,078

(22) PCT Filed: May 15, 2003

(86) PCT No.: PCT/IB03/02071

§ 371 (c)(1),
(2), (4) Date: Nov. 18, 2004

(87) PCT Pub. No.: WO03/101098

PCT Pub. Date: Dec. 4, 2003

(65) Prior Publication Data

US 2005/0206788 A1      Sep. 22, 2005

(30) Foreign Application Priority Data

May 23, 2002  (GB) ................................. 0211898.2

(51) Int. Cl.
*H04N 11/00*  (2006.01)
*H04N 5/44*  (2006.01)
*H04N 5/58*  (2006.01)

(52) U.S. Cl. ..................... 348/553; 348/552; 348/603
(58) Field of Classification Search ............... 348/602, 348/460, 553, 552, 739; 463/30–34
See application file for complete search history.

(56) References Cited

U.S. PATENT DOCUMENTS

| | | | | |
|---|---|---|---|---|
| 3,932,742 A * | 1/1976 | Freudenschuss et al. | ...... | 327/39 |
| 4,600,200 A * | 7/1986 | Oka et al. | ...... | 463/33 |
| 5,488,434 A * | 1/1996 | Jung | ...... | 348/725 |
| 5,548,346 A * | 8/1996 | Mimura et al. | ...... | 348/738 |
| 5,627,584 A * | 5/1997 | Nishikori et al. | ...... | 348/72 |
| 5,717,414 A * | 2/1998 | Bergsneider et al. | ...... | 345/8 |
| 5,734,590 A | 3/1998 | Tebbe | | |
| 5,825,347 A * | 10/1998 | Prinsen | ...... | 345/629 |
| 6,270,229 B1 * | 8/2001 | Chien | ...... | 362/84 |
| 6,282,458 B1 | 8/2001 | Murayama et al. | | |
| 6,338,818 B2 | 1/2002 | Budman | | |
| 6,611,297 B1 * | 8/2003 | Akashi et al. | ...... | 348/739 |
| 6,778,226 B1 * | 8/2004 | Eshelman et al. | ...... | 348/836 |
| 7,071,897 B2 * | 7/2006 | Bronson | ...... | 345/7 |
| 7,180,529 B2 * | 2/2007 | Covannon et al. | ...... | 345/690 |
| 7,259,760 B1 * | 8/2007 | Hashimoto et al. | ...... | 345/419 |
| 7,385,359 B2 * | 6/2008 | Dowling et al. | ...... | 315/292 |
| 2002/0015097 A1 * | 2/2002 | Martens et al. | ...... | 348/207 |

FOREIGN PATENT DOCUMENTS

| | | | |
|---|---|---|---|
| DE | 4207417 A | 9/1993 | |
| GB | 2187902 A | 9/1987 | |
| WO | 9938102 A1 | 7/1999 | |
| WO | 0199435 A | 12/2001 | |

OTHER PUBLICATIONS

ISR, International Search Report PCT/IB2003/02071.

* cited by examiner

*Primary Examiner*—Victor R Kostak

(57) ABSTRACT

A method of providing one or more aspects of an ambient environment comprises receiving a video signal, processing the video signal and controlling ambient light accordingly. A corresponding device and system of devices are described.

12 Claims, 2 Drawing Sheets

CONTROLLING AMBIENT LIGHT AS A FUNCTION OF A VIDEO SIGNAL

Figure 1:
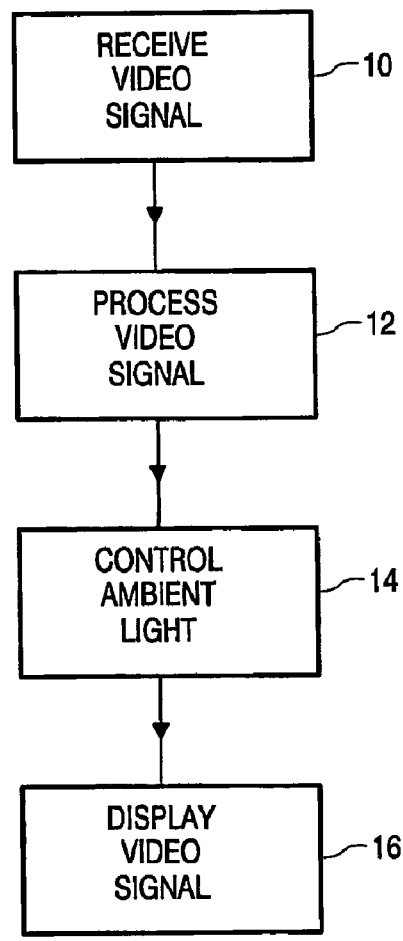

This invention relates to a method of, and a device for, providing one or more aspects of an ambient environment. This invention also relates to a system comprising a set of devices for providing one or more aspects of an ambient environment. In particular, it relates to the controlling of ambient light.

International patent application publication WO 01/99435 discloses methods and systems for controlling consumer electronics external devices via data delivered to a device. Command information is embedded into an EPG (electronic program guide) signal and transmitted from a headend or transmission facility through a distribution network to an end user. As an example, the program data includes volume, lighting, Internet or environmental tag information for controlling external devices, such as a surround sound entertainment system, home environment system, personal computer, etc. A set top box or other properly configured consumer electronics device either receives data from the external device to affect programming or transmits data to the external device to optimise the viewing experience or to supplement information provided by the EPG.

U.S. Pat. No. 6,338,818 B2 discloses the use of an aroma sensory stimulation in multimedia. An apparatus for the remote or local delivery of stored or real-time aroma sensory information to an end-user of a multimedia device is disclosed. The invention includes an aroma converter for encoding aroma information into electrical signals, a delivery system for delivering the electrical signals, and a retrieval system for receiving and processing the electrical to control the aroma or combination of aromas emitted by one or more aroma release chambers.

Both of the systems described in these prior art documents are systems for the augmentation of multimedia experiences. However both systems work on the basis of transmitting control signals that control specific parameters of specific devices. Such control signals need to be authored for each specific application or associated content and need to be transmitted along with the application or content. This has the disadvantage that control signals need to be created for any application or content that wishes to take advantage of the available augmentation, with the obvious resource cost involved. Such systems also face a commercial barrier in that until there is significant penetration of the systems with the consumer, there is insufficient supply of content with the necessary control signals, which in turn weakens commercial sales.

It is therefore an object of the invention to overcome this disadvantage of the prior art, in the area of controlling ambient light.

According to a first aspect of the invention, there is provided a method of providing one or more aspects of an ambient environment comprising receiving a video signal, processing said video signal and controlling ambient light accordingly.

According to a second aspect of the invention, there is provided a device for providing one or more aspects of an ambient environment comprising receiving means for receiving a video signal, processing means for processing said video signal and controlling means for controlling ambient light accordingly.

According to a third aspect of the invention, there is provided a system comprising a set of devices for providing one or more aspects of an ambient environment, the system arranged to receive a video signal, to process said signal and to control ambient light accordingly.

Owing to the invention, it is possible to control ambient light by processing a video signal, without the need to send a control signal with the video signal.

Advantageously, the video signal is itself displayed. The processing may comprise ascertaining the dominant colour in the video signal, and the ambient light is controlled to display the dominant colour, or may comprise ascertaining the colour of the most mobile elements in the video signal, and the ambient light is controlled to display the colour. The processing and the controlling advantageously occur in real time.

Embodiments of the invention will now be described, by way of example only, with reference to the accompanying drawings, in which:—

Figure 2:
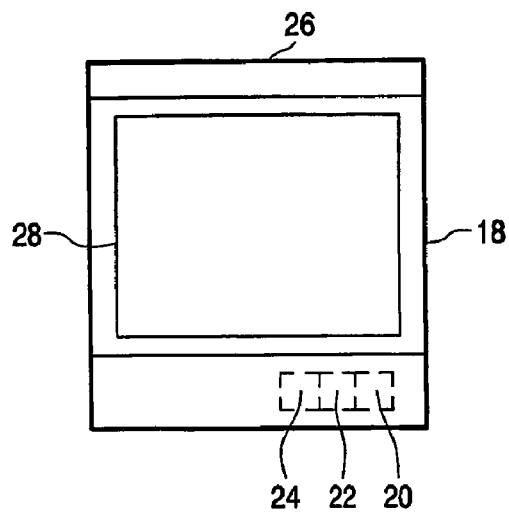
Figure 3:
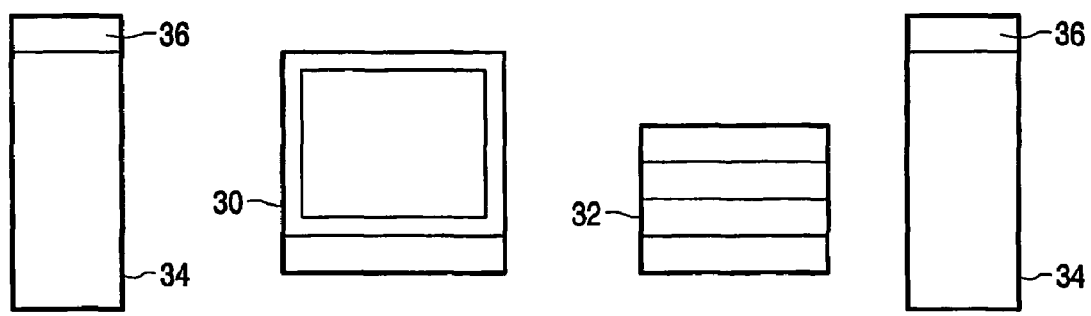

FIG. 1 is a flowchart of a method of providing one aspect (ambient light) of an ambient environment, FIG. 2 is a schematic representation of a device for providing aspects of an ambient environment, and FIG. 3 is a schematic representation of a system comprising a set of devices for providing aspects of an ambient environment.

In the flowchart of FIG. 1, the first step 10 in the method of providing one or more aspects of an ambient environment is receiving a video signal. Such a video signal would be received, for example, by a digital television receiver as part of a broadcast television signal. Equally, the video signal may be received from a local store, such as a video recorder or personal computer. There is no requirement for any particular format of the video signal; it is sufficient that the signal comprises some information that is recognisable as video data. The video signal could be a single image or be a streamed flow of images.

Following receipt of the video signal in step 10, processing of the video signal takes place, as designated by step 12. This processing can be carried out, for example, by software such as a JAVA module run by the CPU of the digital television, or equally an embedded process on an IC could carry out the processing of the video signal. This processing, in one embodiment, would comprise ascertaining the dominant colour in the video signal, this being achieved by a simple scan of the colour values of the pixels of a frame, to find the most frequently occurring colour in that frame. If any of various standard compression techniques (MPEG, JPEG) are used in the format of the video signal, this still allows the determination of the dominant colour, based upon processing of the video signal. Another possible method for determining the information from the video signal is a simple in line analysis of the RGB content of the displayed image of the video signal. An analogue video signal can be processed in this manner.

Once the video signal has been processed, at step 12, the next stage, shown at step 14 is carried out. This step 14 is the controlling of the ambient light according to the result of the processing of the video signal. The ambient light is the light in an environment that is generated to illuminate that environment. A digital television may be provided with a backlight, which can illuminate the wall behind it. This backlight is controlled according to the processing of the video signal. For example, in the embodiment where the processing comprises determining the dominant colour in the video signal, then the ambient light is controlled to display the dominant colour. The processing and controlling occur in real time.

The method of FIG. 1 also includes the optional step 16 of displaying the video signal. So in addition to the control of the ambient light according to the processing carried out on the video signal, the video signal is itself displayed. Therefore, in the example of a digital television, the television is displaying the video signal, and the backlight is controlling the ambient light according to the processing carried out. An augmentation of the experience of the video signal is achieved. The television may have a number of lights for providing the ambient light. Such a group of lights can be triggered in different combinations and patterns.

FIG. 2 shows an example of a device for providing one or more aspects of the ambient environment, being a digital television receiver 18. The television 18 comprises receiving means 20 for receiving a video signal, processing means 22 for processing the video signal and controlling means 24 for controlling the ambient light accordingly. These are shown schematically in the Figure, but in reality will be portions of a chipset, or comprise software program portions run by a CPU.

The video signal, which forms part of a broadcast signal, is received by the television 18, for example via a cable from a satellite dish. The video signal is handled using the method described above with reference to FIG. 1. The device 18 further comprises light emitting means 26 for emitting the ambient light. The device 18 further comprises display means 28 for displaying the video signal. It is entirely possible to have a device without display functionality that receives the video signal and controls the ambient light without displaying the video signal that is the basis for the control of that ambient light. Such a device simply carries out the processing of the video signal without any further use for that signal.

As an example of the operation of the television 18, consider the case of a football match being broadcast to the television 18. In this instance the receiving means 20 receives the video signal, which is a portion of the broadcast signal received by the television 18. The processing means 22 processes the video signal to determine the dominant colour in the video signal. For much of the match, this will be a particular shade of green. The control means 24 will control the ambient light accordingly, by setting the requisite luminance and chrominance levels of the light emitting means 26.

The light emitting means 26 will thus create ambient light behind the television 18 of, most frequently, the appropriate shade of green, as an augmentation or an alternative to the video signal of the football match shown on the display means 28. Of course this processing and controlling takes place in real time, so any changes in the video signal, for example of crowd shots or player close ups, will result in an equivalent change in the ambient light emitted by the light emitting means 26. If the video signal is not displayed on the display device 28 (as determined by user selection), nevertheless a user will be able to follow at least some aspects of the football match, from the changes in the ambient light.

FIG. 3 shows a system comprising a set of devices for providing aspects of an ambient environment. The system comprises a digital television 30, a hi-fi stack 32 (comprising typical devices such as a CD player, amplifier, turntable etc.) and speakers 34. The devices making up the system are interconnected via a wireless network. The system is arranged to receive a video signal, to process the video signal and to control ambient light accordingly.

The television 30 is a device with display means for displaying the video signal, and the speakers 34 are devices with audio means for providing an audio output. The system receives a video signal, in much the same manner as described above for the device of FIG. 2. The video signal is processed, again as described above in the method described with reference to FIG. 1. A device of the system carries out the processing of the signal, and the ambient light is controlled accordingly.

The ambient light is provided by light emitting means 36, which are located within the speakers 34. The ambient light is controlled by the system according to the processing of the video signal. The processing could be carried out in, for example, the digital television, which controls the light emitting means 36 in each speaker 34, to produce the desired ambient light.

The ambient light produced by the light emitting means (in either the device of FIG. 2 or the system of FIG. 3) can go beyond a simple colour, as desired by the user of such a device or system. For example, the light emitting means can produce a variety of colours simultaneously, with different ambient light levels and/or colours in different parts of the ambient environment.

A complex relationship between the ambient light and the original video signal can be achieved, that goes beyond simply ascertaining the dominant colour. Analysis of motion, rate of image change or aggregate affects can be used. This would, for example, determine the colour of the football team having the most active players in the image, or could determine the colour of a racing car dominating an image of a motor race. If the video signal is encoded using MPEG, this can be determined from the MPEG encoding, which includes movement information. The processing of the video signal comprises ascertaining the colour of the most mobile elements in the signal, and the ambient light is controlled to display that colour.

The invention claimed is:

1. A method of providing one or more aspects of an ambient environment comprising receiving a video signal for display on a display device, processing said video signal and controlling ambient light external to said display device accordingly as a function of said video signal, wherein said processing comprises ascertaining the color of the most mobile elements in said video signal, and said ambient light is controlled to display only said color.

2. The method according to claim 1, and further comprising displaying said video signal.

3. The method according to claim 1 or 2, wherein said processing comprises ascertaining the dominant color in said video signal, and said ambient light is controlled to display said dominant color.

4. The method according to claim 1 or 2, wherein said processing and said controlling occur in real time.

5. A device for providing one or more aspects of an ambient environment external to said device comprising receiving means for receiving a video signal, processing means for processing said video signal and controlling means for controlling ambient light accordingly as a function of said video signal, wherein said function includes detecting a color of the most mobile elements in said video signal, and said ambient light is controlled to display only said color.

6. The device according to claim 5, and further comprising display means for displaying said video signal.

7. A device according to claim 5 or 6, and further comprising light emitting means for emitting said ambient light.

8. A device according to claim 5 or 6, wherein said device is a digital television receiver.

9. A system comprising a set of devices for providing one or more aspects of an ambient environment, the system arranged to receive a video signal for display on a display device, to process said signal and to control ambient light external to said devices accordingly as a function of said video signal, wherein said function includes detecting a color of the most mobile elements in said video signal, and said ambient light is controlled to display only said color.

10. The system according to claim 9, said set including a device with display means for displaying said video signal.

11. The system according to claim 9 or 10, said set including a device with audio means.

12. The system according to claim 11, said device with audio means further comprising light emitting means for emitting said ambient light.

* * * * *